US012316709B1

(12) United States Patent
Jain et al.

(10) Patent No.: US 12,316,709 B1
(45) Date of Patent: May 27, 2025

(54) SYSTEM AND METHOD FOR BIDIRECTIONAL REPLICATION OF SCOPE CHANGES FOR WORK ITEMS BETWEEN APPLICATIONS

(71) Applicants: Sandeep Jain, Palo Alto, CA (US); Dimple Jayendra Shah, Ahmedabad (IN); Aparna Garg, Gurgaon (IN)

(72) Inventors: Sandeep Jain, Palo Alto, CA (US); Dimple Jayendra Shah, Ahmedabad (IN); Aparna Garg, Gurgaon (IN)

(73) Assignee: OPSHUB INC., Palo Alto, CA (US)

( * ) Notice: Subject to any disclaimer, the term of this patent is extended or adjusted under 35 U.S.C. 154(b) by 10 days.

(21) Appl. No.: 18/434,037

(22) Filed: Feb. 6, 2024

(51) Int. Cl.
*H04L 67/00* (2022.01)
*H04L 41/0873* (2022.01)
*H04L 67/1095* (2022.01)

(52) U.S. Cl.
CPC .......... *H04L 67/34* (2013.01); *H04L 41/0873* (2013.01); *H04L 67/1095* (2013.01)

(58) Field of Classification Search
None
See application file for complete search history.

(56) References Cited

U.S. PATENT DOCUMENTS

| 9,176,951 | B2 * | 11/2015 | Patrudu | G06N 5/02 |
| 2018/0262405 | A1 * | 9/2018 | Papageorgiou | H04L 41/5025 |
| 2023/0036694 | A1 * | 2/2023 | Coughlan | G06Q 20/385 |

OTHER PUBLICATIONS

Zhao et al., "UFC2: User-Friendly Collaborative Cloud", Sep. 1, 2022, IEEE, IEEE Transactions on Parallel and Distributed Systems (vol. 33, Issue: 9, 2022, pp. 2163-2182) (Year: 2022).*

* cited by examiner

*Primary Examiner* — Davoud A Zand
(74) *Attorney, Agent, or Firm* — Joy S. Goudie

(57) ABSTRACT

The embodiments herein provide a system and method for bidirectional replication of scope changes for work items between applications are provided. The embodiments herein identify scope change for a given work item and transform the scope change of the work item from a source application to a target application. The embodiments herein further check if the work item in the target application is in an expected state and then move the work item from one scope to another in the target application. Moreover, if the target application fails to support the movement of the work item from one scope to another, then the embodiments herein deprecate the work item in an old scope of the target application and create a new work item in the target application with a new scope.

20 Claims, 6 Drawing Sheets

SYSTEM AND METHOD FOR BIDIRECTIONAL REPLICATION OF SCOPE CHANGES FOR WORK ITEMS BETWEEN APPLICATIONS

BACKGROUND

Technical Field

The embodiments herein generally relate to permitting scope change for a work item in the destination system. The embodiments particularly relate to a system and a method for enabling scope changes for work items between applications. The embodiments more particularly relate to a system and method for bidirectional replication of scope changes for work items between applications.

Description of the Related Art

Application integration platforms integrate data between applications to keep data across the applications up to date- and consistent. Multiple users use data in these applications to make several important decisions. However, application users often move the data around as part of re-organization or user error. When such movement happens, application platforms today fail to handle it properly and end up either cloning data in a new container, rather than moving it or not doing anything at all.

Most of the applications allow users to define work item forms depending on work item type, project, workspace. Integration platforms are limited to broadly, three operations-creating work items, updating work items, and deleting work items. What is not addressed is work item scope change i.e., when a work item's scope changes from one project to another project or when its type is changed from let's say Bug to Story. The reasons for work item scope change is difficult to replicate and are multiple. The reasons include methods to detect the scope change, as this requires intense bookkeeping or object movement logs due to the diverse behavior of different systems. Some systems create an audit log whenever the work item is moved between scopes. Some systems fail to maintain an audit log and hence there is no way from the end system to know if the scope was changed or not. Furthermore, certain systems allow restructuring of project or container hierarchy, for example moving a child project from one parent to another, as no event occurred on the work item itself, and no audit entry is created.

Furthermore, field configurations for the old and new scopes may be different. When updating the work item in the new scope, the payload needs to be adjusted according to the schema of the new scope. Scope change is not limited to just updating the project and issue type for the work item, but other fields available in the new scope. Also, all end systems don't have APIs to move work items from one scope to another. There are instances where simultaneously, the associated work item in the destination tool was also updated, such that the conflicts cannot be detected and resolved. Moreover, if a work item is moved to a scope that is not configured for integration.

One of the common solutions adopted to deal with the scope change is the existing work item in the old scope in the destination tool is left as it is and a new work item is created in the new scope. Now if the old scope work item is updated, then naïve integration platforms will create another work item in target while a more mature one will identify that the work item in the old scope is actually deprecated and won't be integrated back. In either case, it results in an inconsistency between the two systems, as there are two work items in the target system versus one work item in the source, or with time, it will increase the number of unmaintained work items in both systems. Bi-directional sync further complicates the situation.

One common recommendation given by integration tool vendors is that instead of changing the work item type or project, users can clone the work item into the new scope and close the old work item. Though this retains sanctity in both systems given this needs to be taken care of manually it becomes practically impossible to implement at scale. Additionally, there are integration needs, where when the scope is changed in one application, it should not update the work item scope in other applications. This makes it a furthermore complex problem.

Hence, there is a long-felt need for an automated mechanism that can reflect scope change for work items between different tools.

The above-mentioned shortcomings, disadvantages, and problems are addressed herein, and which will be understood by reading and studying the following specification.

OBJECTIVES OF THE EMBODIMENTS HEREIN

The principal object of the embodiment herein is to provide a system and a method for bidirectional replication of scope changes for work items between applications.

Another object of the embodiment herein is to provide a system and method for bidirectional replication of scope changes for work items between applications, by identifying and fetching a scope change for a work item in a source application.

Yet another object of the embodiment herein is to transform the scope change of the work item from a source application to a target application.

Yet another object of the embodiment herein is to check for conflicts between the source application and the target application.

Yet another object of the embodiment herein is to validate the work item, such that it is in an expected state on the target application.

Yet another object of the embodiment herein is to allow the movement of the work item from one scope to another scope in the target application.

Yet another object of the embodiment herein is to deprecate the work item in an old scope of the target application and create a new work item in the target application in a new scope if the target application fails to support the scope change of an existing work item.

Yet another object of the embodiment herein is to perform update operations depending upon the properties updated in the source application and the target application.

These and other objects and advantages of the present invention will become readily apparent from the following detailed description taken in conjunction with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

This Summary is provided to introduce a selection of concepts in a simplified form that is further described below in the Detailed Description. This Summary is not intended to identify key or essential features of the claimed subject matter, nor is it intended to be used as an aid in determining the scope of the claimed subject matter.

The various embodiments herein provide a system and method for bidirectional replication of scope changes for work items between applications. The embodiments herein enable scope change for a work item in the destination system or target system. The embodiments herein identify scope change for a given work item and transform the scope change of the work item from a source application to a target application. The embodiments herein further check if the work item in the target application is in an expected state and then move the work item from one scope to another in the target application. Moreover, if the target application fails to support the movement of the work item from one scope to another, then the embodiments herein deprecate the work item in an old scope of the target application and create a new work item in the target application with a new scope.

According to one embodiment herein, a method for bidirectional replication of scope changes for work items between applications is provided. The method comprises identifying and fetching a scope change from a scope change event for a work item in a source application. The method further involves transforming the scope change of the work item from the source application to a target application. While transforming the scope change of the work item from the source application to the target application the method involves transforming an old-source-object in the source application to obtain an old-target-object and transforming a new-source-object to obtain a current-target-object of the work item. Furthermore, the method involves checking for conflicts between the old-source-object of the source application and the current-target-object of the target application and resolving the conflicts if any as per user configuration. The method further involves validating the work item, such that it is in an expected state on the target application. During validation, the method ensures that the work item is in the same scope as the work item last synched in the target application. Furthermore, the method involves moving the work item from one scope to another scope in the target application, and if the target application fails to support the movement of the work item from one scope to another scope, then the method deprecates the work item in an old scope of the target application and creates a new work item in the target application in a new scope. In addition, the method involves performing update operations depending upon the properties updated in the source application, and the work item transitioned from the old scope to the new scope of the target application.

According to one embodiment herein, the scope change includes a change of the work item or movement of the work item. The scope change event comprises the old-source-Object and the new-source-object, such that the old-source-object comprises values set in the work item before the scope change, and the new-source-object comprises values set in the work item after the scope change.

According to one embodiment herein, the method for fetching the scope change event for the work item of the source application is provided. The method comprises detecting and fetching the scope change events for the work item within a given scope (S2) from the source application. The scope change events comprise an object unique identifier on which an event occurred, the time of an event, changes made to the work item, old values comprising properties of the work item before the scope change, and new values comprising the properties of the work item after the scope change. The method employs a polling or webhook mechanism to detect any changes done in the source application within a given scope (S2). Further, the method comprises iterating through the scope change events to identify the objects that were moved to the scope (S2) from other scopes. The iteration through the scope change events involves checking the database if the given object was integrated before. In case the object is integrated, then the object must have been integrated before the old scope which is the scope in which the object existed before S2. Furthermore, during iteration, the method fetches the old scope for the object and sets the old scope of the object in the scope change events. Further, the object's scope with S2 in the database is updated, and all the scope change events are synced to the target application.

According to one embodiment herein, the method for transforming the old-source-object in the source application is provided. The method comprises obtaining the old scope from the scope change events. The old scope of the work item refers to the object type or project in which the work item used to exist. The method further involves obtaining the work item's object properties comprising old values from the scope change events. Further, fetching user configuration for transformation of the old scope of the work item, transforming the old values to obtain transformed-old properties, and returning the transformed-old properties.

According to one embodiment herein, the method for transforming the new-source-object is provided. The method involves obtaining the new scope from the scope change events and obtaining the work items object properties comprising new values from the scope change events. The method further involves fetching user configuration for the transformation of the new scope of the work item and transforming the new values to obtain transformed-new properties. The transformed-new properties comprise those settings the user needs to perform in case the target application fails to support moving objects between the scope. Furthermore, the method involves returning the transformed-new properties.

According to one embodiment herein, the transformation of the scope change of the work item from the source application to the target application depends on the user configuration and the transformation information configured by the user for the old scope of the work item and the new scope of the work item. Moreover, the user configuration comprises the properties of the source application the user intends to synchronize to the target application when creating the object and updating the object.

According to one embodiment herein, the method for managing the conflicts between the old-source-object of the source application and the current-target-object of the target application is provided. The method involves obtaining the current object properties of the work item from the target application. Further, the method involves comparing the transformed-old properties of the work item with the current-target-object. In addition, the method also compares the scope changes between the transformed-old properties and the current object properties of the target application. Furthermore, the method involves resolving the conflict, if there is any difference in the scope changes using the user's conflict resolution settings.

According to one embodiment herein, while moving the work item from one scope to another scope in the target application, if the target application fails to support the movement of the work item from one scope to another scope, then the method deprecates the work item in the old scope of the target application and creates a new work item in the target application in the new scope. To deprecate the work item in the old scope of the target application the method fetches the user configuration comprising means of deprecating the work item in the target application including soft deleting or updating the work item object by adding notes or comments.

According to one embodiment herein, the method for moving the work item from one scope to another scope in the target application if the target application fails to support the movement of the work item is provided. The method comprises fetching the existing work item object in the target application. The method further involves constructing the new work item object in the new scope of the target application by setting the object properties in the new work item object, creating the new work item object in the target application, and copying comments, attached files, links and any other field from the existing work item object to the new work item object. Furthermore, the method involves fetching the user configuration for marking the work item objects to be deprecated in the target application. In addition, the method includes applying the user configuration for the deprecated work item objects to the existing work item object and updating the persistent data store or database to not integrate any updates with deprecated work item objects.

According to one embodiment herein, a system for bidirectional replication of scope changes for work items between applications is provided. The system comprises a scope change identification module configured to identify and fetch a scope change from a scope change event for a work item in a source application. The system further comprises a transformation module configured to transform the scope change of the work item from the source application to a target application. While transforming the scope change of the work item from the source application to the target application the transformation module is configured to transform an old-source-object in the source application to obtain an old-target-object and transform a new-source-object to obtain a current-target-object of the work item. The system further comprises a conflict management module configured to check for conflicts between the old-source-object of the source application and the current-target-object of the target application and resolve the conflicts if any as per user configuration. In addition, the system comprises a validation module configured to validate if the work item is in an expected state on the target application. Furthermore, the system comprises a synchronization module configured to move the work item from one scope to another scope in the target application, but if the target application fails to support the movement of the work item from one scope to another scope, then the synchronization module is configured to deprecate the work item in an old scope of the target application and create a new work item in the target application in a new scope. The system also comprises a scope updation module configured to perform update operations depending upon the properties updated in the source application, and the work item is then transitioned from the old scope to the new scope of the target application.

According to one embodiment herein, the scope change by the scope change identification module includes a change of the work item or movement of the work item. The scope change event comprises the old-source-object and the new-source-object, such that the old-source-object comprises values set in the work item before the scope change, and the new-source-object comprises values set in the work item after the scope change.

According to one embodiment herein, the method for fetching the scope change event for the work item of the source application by the scope change identification module is provided. The method comprises detecting and fetching the scope change events for the work item within a given scope (S2) from the source application. The scope change events comprise an object unique identifier on which an event occurred, the time of an event, changes made to the work item, old values comprising properties of the work item before the scope change and new values comprising the properties of the work item after the scope change. The method further comprises iterating through the scope change events to identify the objects that were moved to the scope (S2) from other scopes and synchronizing all the scope changes of the objects with the target application.

According to one embodiment herein, the method for transforming the old-source-object in the source application by the transformation module is provided. The method comprises obtaining the old scope from the scope change events, obtaining the work items object properties comprising old values from the scope change events, fetching user configuration for transformation of the old scope of the work item, transforming the old values to obtain transformed-old properties, and returning transformed-old properties.

According to one embodiment herein, the transformation module is also configured to transform a new-source-object. The method comprises obtaining the new scope from the scope change events, obtaining the work items object properties comprising new values from the scope change events, fetching user configuration for transformation of the new scope of the work item, and transforming the new values to obtain transformed-new properties. The transformed-new properties comprise those settings the user needs to perform in case the target application fails to support moving objects between the scope. Further, the method returns the transformed-new properties.

According to one embodiment herein, the transformation of the scope change of the work item by the transformation module depends on the user configuration and the transformation information configured by the user for the old scope of the work item and the new scope of the work item. The user configuration comprises the properties of the source application the user intends to synchronize to the target application when creating the object and updating the object.

According to one embodiment herein, the conflict management module is configured to manage the conflict between the old-source-object of the source application and the current-target-object of the target application and resolve the conflicts if any as per user configuration. The method for managing the conflict is provided. The method comprises obtaining the current object properties of the work item from the target application, comparing the transformed-old properties of the work item with the current-target-object in the target application, comparing the scope changes between the transformed-old properties and the current object properties of the target application, and resolving the conflict, if there is any difference in the scope changes using user's conflict resolution settings.

According to one embodiment herein, the synchronization module configured to deprecate the work item in the old scope of the target application fetches the user configuration comprising means of deprecating the work item in the target application including soft deleting or updating the work item object by adding notes or comments.

According to one embodiment herein, the synchronization module is configured to move the work item from one scope to another scope in the target application if the target application fails to support the movement of the work item. The method involves fetching the existing work item object in the target application. The method further involves constructing new work item object in the new scope of the target application by setting object properties in the new work item object, creating the new work item object in the target application, and copying comments attached files, links and any other field from the existing work item object to the new work item object. In addition, the method involves fetching the user configuration for marking the work item objects to be deprecated in the target application. Further, applying the user configuration for the deprecated work item objects to the existing work item object, and updating a persistent data store to not integrate any updates with deprecated work item objects.

The foregoing summary is illustrative only and is not intended to be in any way limiting. In addition to the illustrative aspects, embodiments, and features described above, further aspects, embodiments, and features will become apparent by reference to the drawings and the following detailed description.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1A:
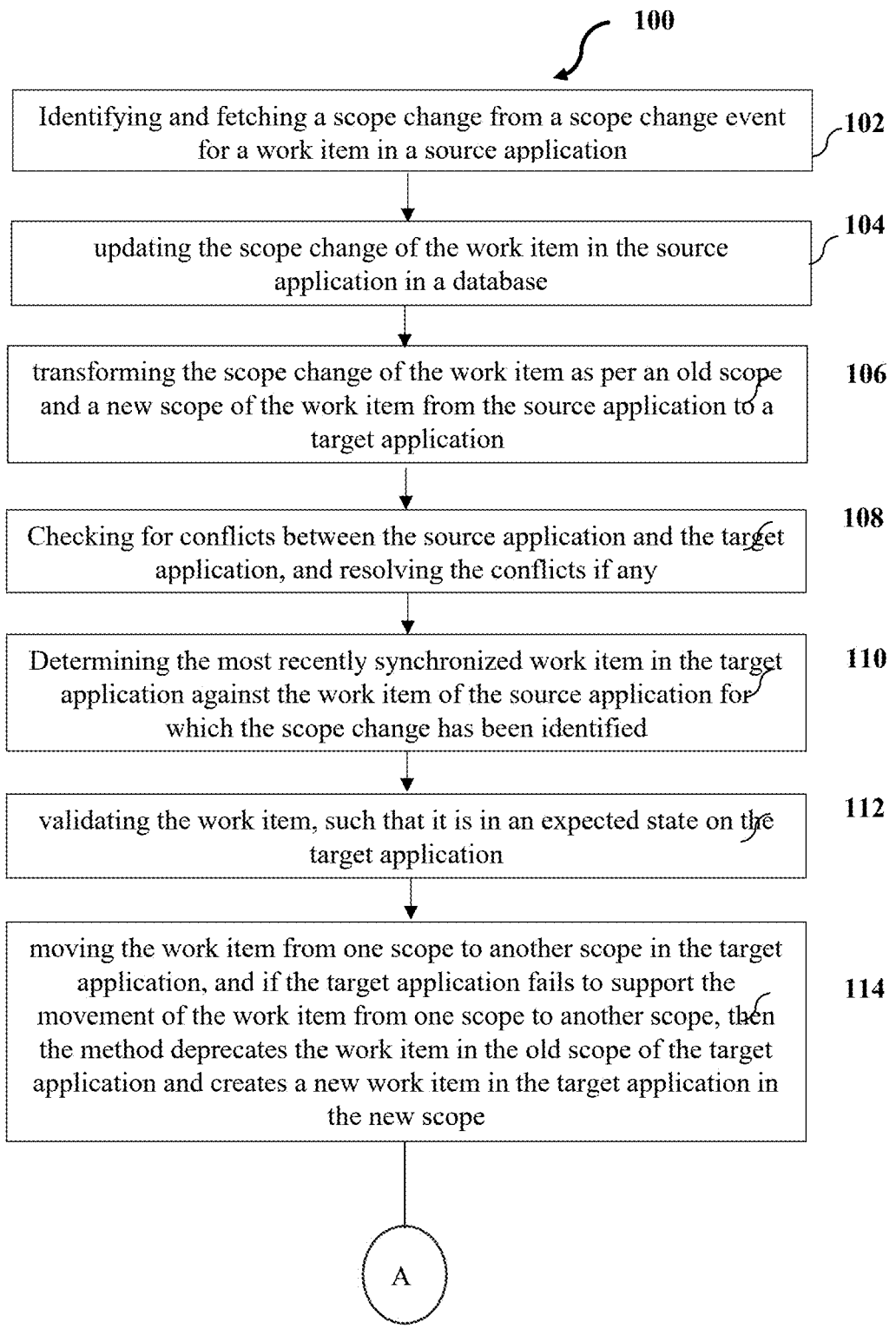
FIG. 1A and FIG. 1B jointly illustrate a flowchart on a method for bidirectional replication of scope changes for work items between applications, according to an embodiment herein.

Although the specific features of the present invention are shown in some drawings and not in others. This is done for convenience only as each feature may be combined with any or all of the other features in accordance with the present invention.

DETAILED DESCRIPTION OF THE EMBODIMENTS HEREIN

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical, and other changes may be made without departing from the scope of the embodiments. The following detailed description is therefore not to be taken in a limiting sense.

The foregoing of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

The various embodiments herein provide a system and method for bidirectional replication of scope changes for work items between applications. The embodiments herein enable scope change for a work item in the destination system or target system. The embodiments herein identify scope change for a given work item and transform the scope change of the work item from a source application to a target application. The embodiments herein further check if the work item in the target application is in an expected state and then move the work item from one scope to another in the target application. Moreover, if the target application fails to support the movement of the work item from one scope to another, then the embodiments herein deprecate the work item in an old scope of the target application and create a new work item in the target application with a new scope.

As used herein the term "Application" refers to any endpoint that contains data like databases, application management systems, resource planning systems, etc.

The term "Scope" refers to a container for which the end user can have distinct configurations like screen layout. For example, in most applications, scope refers to the work item type and project in which the work item exists.

The term "Object" refers to an actual object that needs to be moved from one scope to another.

The term "Work item" refers to an instance of an object in applications.

The term "Scope Change" refers to a change in work item object type or project. For example, a work item object converted from type Bug to type Story, or a work item object moved from one project to another in applications.

According to one embodiment herein, a method for bidirectional replication of scope changes for work items between applications is provided. The method comprises identifying and fetching a scope change from a scope change event for a work item in a source application. The method further involves transforming the scope change of the work item from the source application to a target application. While transforming the scope change of the work item from the source application to the target application the method involves transforming an old-source-object in the source application to obtain an old-target-object and transforming a new-source-object to obtain a current-target-object of the work item. Furthermore, the method involves checking for conflicts between the old-source-object of the source application and the current-target-object of the target application and resolving the conflicts if any as per user configuration. The method further involves validating the work item, such that it is in an expected state on the target application. During validation, the method ensures that the work item is in the same scope as the work item last synched in the target application. For instance, if the method had last synced the work item in scope T1 in the target application, then on the next move the method validates if the work item is still in scope T1. For this purpose, the method maintains an entry in its database and stores the target scope in which the work item was last integrated. Furthermore, the method involves moving the work item from one scope to another scope in the target application, and if the target application fails to support the movement of the work item from one scope to another scope, then the method deprecates the work item in an old scope of the target application and creates a new work item in the target application in a new scope. In addition, the method involves performing update operations depending upon the properties updated in the source application, and the work item transitioned from the old scope to the new scope of the target application.

According to one embodiment herein, the scope change includes a change of the work item or movement of the work item. The scope change event comprises the old-source-Object and the new-source-object, such that the old-source-object comprises values set in the work item before the scope change, and the new-source-object comprises values set in the work item after the scope change.

According to one embodiment herein, the method for fetching the scope change event for the work item of the source application is provided. The method comprises detecting and fetching the scope change events for the work item within a given scope (S2) from the source application. The scope change events comprise an object unique identifier on which an event occurred, the time of an event, changes made to the work item, old values comprising properties of the work item before the scope change, and new values comprising the properties of the work item after the scope change. The method employs a polling or webhook mechanism to detect any changes done in the source application within a given scope (S2). Further, the method comprises iterating through the scope change events to identify the objects that were moved to the scope (S2) from other scopes. The iteration through the scope change events involves checking the database if the given object was integrated before. In case the object is integrated, then the object must have been integrated before the old scope which is the scope in which the object existed before S2. Furthermore, during iteration, the method fetches the old scope for the object and sets the old scope of the object in the scope change events. Further, the object's scope with S2 in the database is updated, and all the scope change events are synced to the target application.

According to one embodiment herein, the method for transforming the old-source-object in the source application is provided. The method comprises obtaining the old scope from the scope change events. The old scope of the work item refers to the object type or project in which the work item used to exist. For example, a work item W1 was of type Bug before and later converted into Story type in the application, then the old scope of W1 is Bug and the new scope is Story. Similarly, if W1 was converted from Bug to Story type and also moved from Project P1 to P2 then the old scope for W1 is Bug and Project P1 whereas the new scope is Story and Project P2. The method further involves obtaining the work items object properties comprising old values from the scope change events. Further, fetching user configuration for transformation of the old scope of the work item, transforming the old values to obtain transformed-old properties, and returning the transformed-old properties.

According to one embodiment herein, the method for transforming the new-source-object is provided. The method involves obtaining the new scope from the scope change events and obtaining the work items object properties comprising new values from the scope change events. The method further involves fetching user configuration for the transformation of the new scope of the work item and transforming the new values to obtain transformed-new properties. The transformed-new properties comprise those settings the user needs to perform in case the target application fails to support moving objects between the scope. Furthermore, the method involves returning the transformed-new properties.

Moreover, if a scope change is detected by the method, then handlers are introduced at transformation layer to identify which field transformation to use to transform data from the source application to the target application, as per new scope. The transformation layer transforms data from the source application to the target application. For example: in the source application, date time zone is IST and in the target application, the time zone is GMT. The transformation layer will transform the IST date coming from the source application to the GMT equivalent date for syncing data to the target application. Furthermore, for instance if in the source application, the work item title field is called 'Summary' whereas in the target application, it is referred to as 'Name'. Then the transformation layer will copy data from the "Summary" property from the source application to "Name" property in target application. Furthermore, the handler decides which transformation to execute to transform data correctly from the source to the target application. The transformation may differ for each scope. So, when the scope changes, the handler will decide which transformation to use to transform the source object as per the old scope and which transformation to use to transform the source object as per the new scope.

According to one embodiment herein, the transformation of the scope change of the work item from the source application to the target application depends on the user configuration and the transformation information configured by the user for the old scope of the work item and the new scope of the work item. Moreover, the user configuration comprises the properties of the source application the user intends to synchronize to the target application at the time of creating the object and updating the object.

According to one embodiment herein, the method for managing the conflicts between the old-source-object of the source application and the current-target-object of the target application is provided. The method involves obtaining the current object properties of the work item from the target application. Further, the method involves comparing the transformed-old properties of the work item with the current_target_object. In addition, the method also compares the scope changes between the transformed-old properties and the current object properties of the target application. Furthermore, the method involves resolving the conflict, if there is any difference in the scope changes using the user's conflict resolution settings.

According to one embodiment herein, while moving the work item from one scope to another scope in the target application, if the target application fails to support the movement of the work item from one scope to another scope, then the method deprecates the work item in the old scope of the target application and creates a new work item in the target application in the new scope. To deprecate the work item in the old scope of the target application the method fetches the user configuration comprising means of deprecating the work item in the target application including soft deleting or updating the work item object by adding notes or comments.

Deprecating the work item involves two steps. In the first step, the method marks in the target system the work item that needs to be deprecated, which is done using transformation-level deprecation settings. Further, the work item in the old scope is deprecated and a new work item in the new scope is created. In the second step, the method tracks in its database that the given work item is deprecated and henceforth the method doesn't need to sync any updates on deprecated work item from the target application back to the source application or from the source application to the target application. Further, the method sync's the updates with the new work item created in the new scope.

Furthermore, in order to deprecate the work item in the old scope the user can specify how they want to deprecate in case the target application fails to support the movement of the work item or object from one scope to another. User provides the inputs in the transformation configuration to either soft delete the work item in the target application or map any target object property and specify the user value. For instance, the user maps the status and sets the value as 'Moved' or maps the comment and specifies the value as 'Work item moved' then while deprecating the old work item, the method will set the work item's status to 'Moved' and add a comment with value 'Work item moved'.

Hence, deprecating the old work item is required only in scenarios where the target application fails to support the direct work item movement from one scope to another. In such case, the method will mark old work item as deprecated in old scope and will create a new work item in the new scope.

Moreover, when the source application supports the scope change, but the target application fails to support, then the scope change occurred as a result of container project restructure i.e., user fail to update the object directly, but moved container project from one parent to another. For example, below is the project hierarchy in system where Object 2 is the work item under Child project 1.

Parent project 1
       Child project
          Object 2
    Parent project 2
    User moves Child project from parent project 1 to parent project 2
    Parent project 1
    Parent project 2
       Child project
          Object 2
    In such case, audit log won't be created in Object 2, as no update happened on object itself, rather Child project 1 was moved to a different parent.

According to one embodiment herein, the method for moving the work item from one scope to another scope in the target application if the target application fails to support the movement of the work item is provided. The method comprises fetching the existing work item object in the target application. The method further involves constructing the new work item object in the new scope of the target application by setting the object properties in the new work item object, creating the new work item object in the target application, and copying comments, attached files, links and any other field from the existing work item object to the new work item object. Furthermore, the method involves fetching the user configuration for marking the work item objects to be deprecated in the target application. In addition, the method includes applying the user configuration for the deprecated work item objects to the existing work item object and updating the persistent data store or database to not integrate any updates with deprecated work item objects.

According to one embodiment herein, a system for bidirectional replication of scope changes for work items between applications is provided. The system comprises a scope change identification module configured to identify and fetch a scope change from a scope change event for a work item in a source application. The system further comprises a transformation module configured to transform the scope change of the work item from the source application to a target application. While transforming the scope change of the work item from the source application to the target application the transformation module is configured to transform an old-source-object in the source application to obtain an old-target-object and transform a new-source-object to obtain a current-target-object of the work item. The system further comprises a conflict management module configured to check for conflicts between the old-source-object of the source application and the current-target-object of the target application and resolve the conflicts if any as per user configuration. In addition, the system comprises a validation module configured to validate if the work item is in an expected state on the target application. Furthermore, the system comprises a synchronization module configured to move the work item from one scope to another scope in the target application, but if the target application fails to support the movement of the work item from one scope to another scope, then the synchronization module is configured to deprecate the work item in an old scope of the target application and create a new work item in the target application in a new scope. The system also comprises a scope updation module configured to perform update operations depending upon the properties updated in the source application, and the work item is then transitioned from the old scope to the new scope of the target application.

According to one embodiment herein, the scope change by the scope change identification module includes a change of the work item or movement of the work item. The scope change event comprises the old-source-object and the new-source-object, such that the old-source-object comprises values set in the work item before the scope change, and the new-source-object comprises values set in the work item after the scope change.

According to one embodiment herein, the method for fetching the scope change event for the work item of the source application by the scope change identification module is provided. The method comprises detecting and fetching the scope change events for the work item within a given scope (S2) from the source application. The scope change events comprise an object unique identifier on which an event occurred, the time of an event, changes made to the work item, old values comprising properties of the work item before the scope change and new values comprising the properties of the work item after the scope change. The method further comprises iterating through the scope change events to identify the objects that were moved to the scope (S2) from other scopes and synchronizing all the scope changes of the objects with the target application.

According to one embodiment herein, the method for transforming the old-source-object in the source application by the transformation module is provided. The method comprises obtaining the old scope from the scope change events, obtaining the work items object properties comprising old values from the scope change events, fetching user configuration for transformation of the old scope of the work item, transforming the old values to obtain transformed-old properties, and returning transformed-old properties.

According to one embodiment herein, the transformation module is also configured to transform a new-source-object. The method comprises obtaining the new scope from the scope change events, obtaining the work items object properties comprising new values from the scope change events, fetching user configuration for transformation of the new scope of the work item, and transforming the new values to obtain transformed-new properties. The transformed-new properties comprise those settings the user needs to perform in case the target application fails to support moving objects between the scope. Further, the method returns the transformed-new properties.

According to one embodiment herein, the transformation of the scope change of the work item by the transformation module depends on the user configuration and the transformation information configured by the user for the old scope of the work item and the new scope of the work item. The user configuration comprises the properties of the source application the user intends to synchronize to the target application when creating the object and updating the object.

According to one embodiment herein, the conflict management module is configured to manage the conflict between the old-source-object of the source application and the current-target-object of the target application and resolve the conflicts if any as per user configuration. The method for managing the conflict is provided. The method comprises obtaining the current object properties of the work item from the target application, comparing the transformed-old properties of the work item with the current-target-object in the target application, comparing the scope changes between the transformed-old properties and the current object properties of the target application, and resolving the conflict, if there is any difference in the scope changes using user's conflict resolution settings.

Moreover, the conflict management module is also configured to identify the object in the target application, if it is in same state as that of the object in the source application, before the source application's object scope got changed. For example, the object in source application SO1 was in scope S1 and was synced to the object in the target application TO1 in scope T1. Now SO1 is moved from scope S1 to scope S2, then before moving TO1 to T2, the system ensures that TO1 is in T1 only and not in any other scope. In this regard an additional database storage is created to track the target application scope in which the system last synced the work item.

According to one embodiment herein, the synchronization module configured to deprecate the work item in the old scope of the target application fetches the user configuration comprising means of deprecating the work item in the target application including soft deleting or updating the work item object by adding notes or comments.

According to one embodiment herein, the synchronization module is configured to move the work item from one scope to another scope in the target application if the target application fails to support the movement of the work item. The method involves fetching the existing work item object in the target application. The method further involves constructing new work item object in the new scope of the target application by setting object properties in the new work item object, creating the new work item object in the target application, and copying comments attached files, links and any other field from the existing work item object to the new work item object. In addition, the method involves fetching the user configuration for marking the work item objects to be deprecated in the target application. Further, applying the user configuration for the deprecated work item objects to the existing work item object, and updating a persistent data store to not integrate any updates with deprecated work item objects.

Figure 1B:
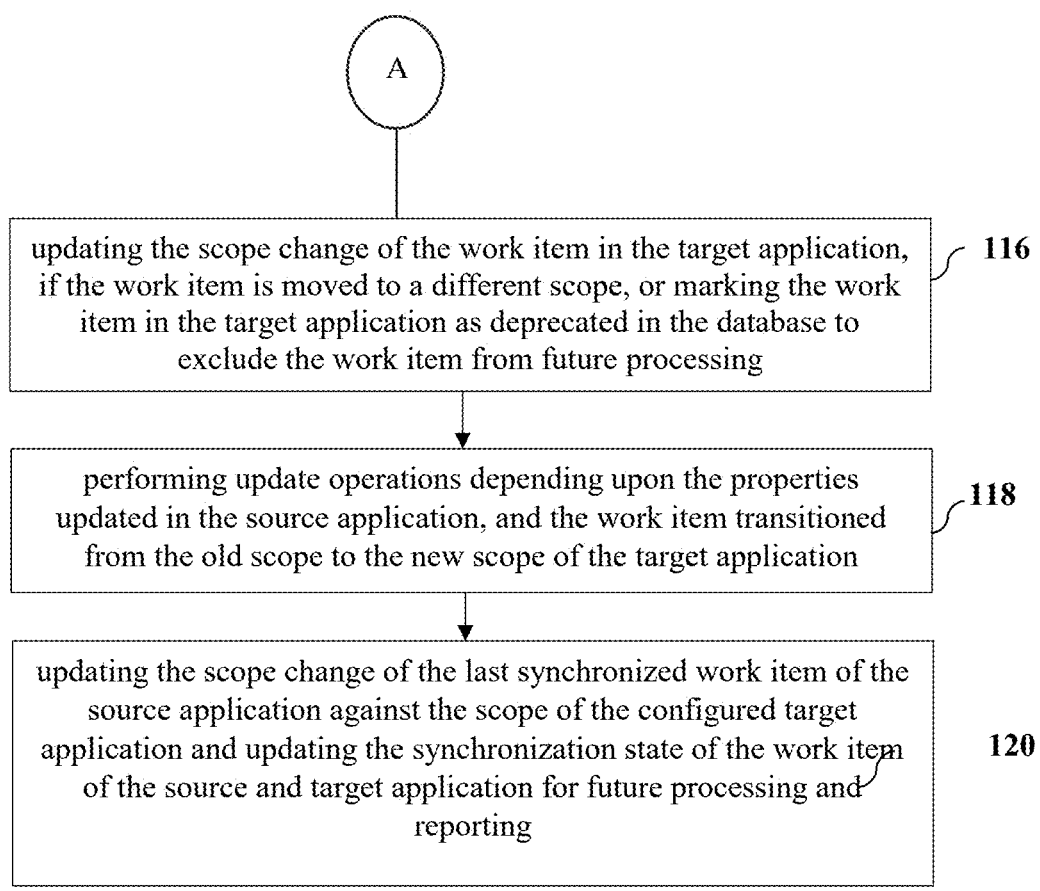

FIG. 1A and FIG. 1B jointly illustrate a flowchart on a method for bidirectional replication of scope changes for work items between applications, according to an embodiment herein. The method 100 comprises identifying and fetching a scope change from a scope change event for a work item in a source application at step 102. The method 100 further involves transforming the scope change of the work item from the source application to a target application at step 104. While transforming the scope change of the work item from the source application to the target application the method involves transforming an old-source-object in the source application to obtain an old-target-object and transforming a new-source-object to obtain a current-target-object of the work item. Furthermore, the method 100 involves checking for conflicts between the old-source-object of the source application and the current-target-object of the target application and resolving the conflicts if any as per user configuration at step 106. The method 100 further involves validating the work item, such that it is in an expected state on the target application at step 108. Furthermore, the method 100 involves moving the work item from one scope to another scope in the target application, and if the target application fails to support the movement of the work item from one scope to another scope, then the method deprecates the work item in an old scope of the target application and creates a new work item in the target application in a new scope at step 110. In addition, the method 100 involves performing update operations depending upon the properties updated in the source application, and the work item transitioned from the old scope to the new scope of the target application at step 112.

Figure 2:
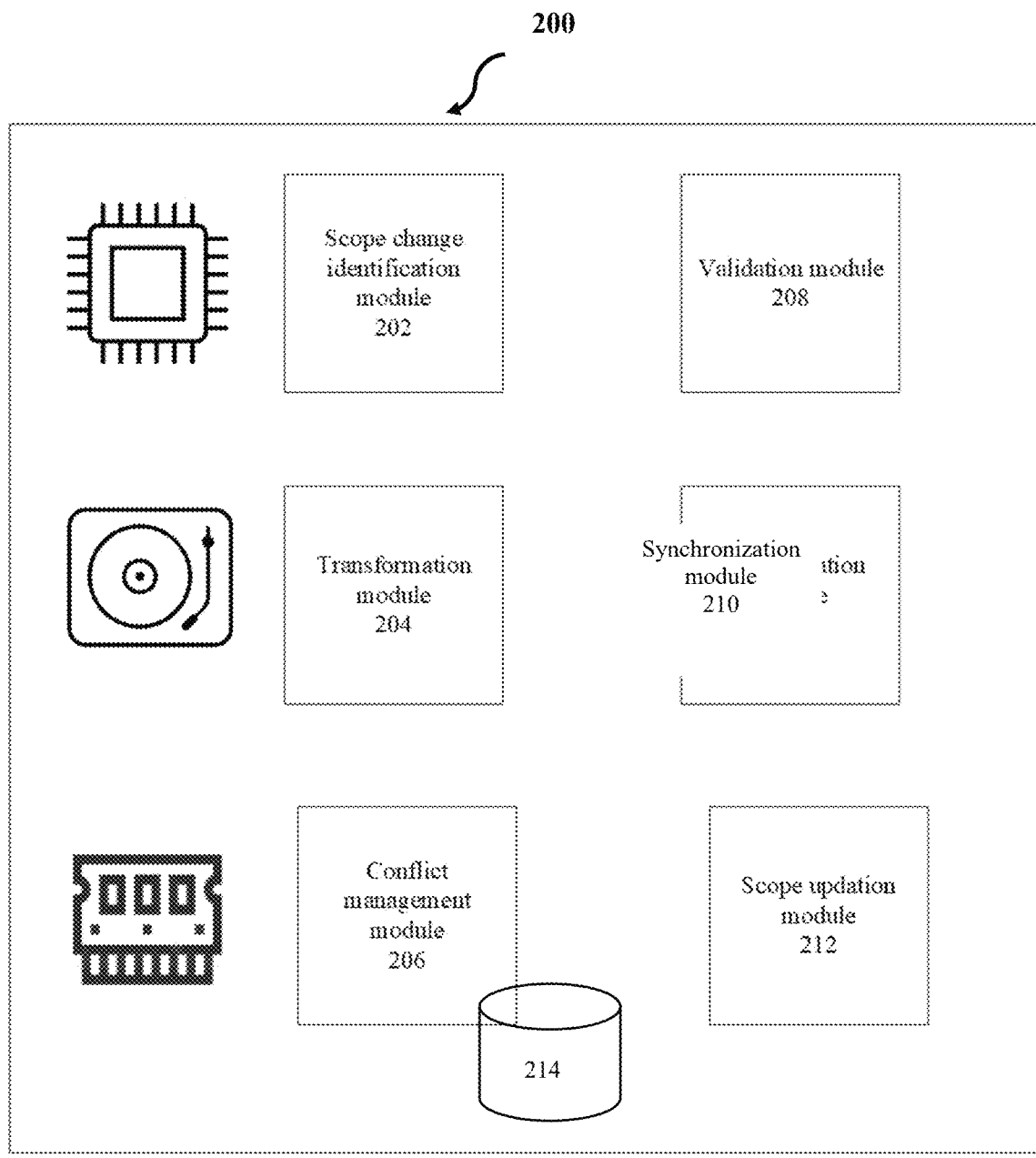
FIG. 2 illustrates a block diagram of an exemplary implementation of a system for bidirectional replication of scope changes for work items between applications, according to an embodiment herein.

FIG. 2 illustrates a block diagram of an exemplary implementation of a system for bidirectional replication of scope changes for work items between applications, according to an embodiment herein. The system 200 comprises a scope change identification module 202 configured to identify and fetch a scope change from a scope change event for a work item in a source application. The system 200 further comprises a transformation module 204 configured to transform the scope change of the work item from the source application to a target application. While transforming the scope change of the work item from the source application to the target application the transformation module is configured to transform an old-source-object in the source application to obtain an old-target-object and transform a new-source-object to obtain a current-target-object of the work item. The system 200 further comprises a conflict management module 206 configured to check for conflicts between the old-source-object of the source application and the current-target-object of the target application and resolve the conflicts if any as per user configuration. In addition, the system 200 comprises a validation module 208 configured to validate if the work item is in an expected state on the target application. Furthermore, the system 200 comprises a synchronization module 210 configured to move the work item from one scope to another scope in the target application, but if the target application fails to support the movement of the work item from one scope to another scope, then the synchronization module is configured to deprecate the work item in an old scope of the target application and create a new work item in the target application in a new scope. The system 200 also comprises a scope updation module 212 configured to perform update operations depending upon the properties updated in the source application, and the work item is then transitioned from the old scope to the new scope of the target application.

Figure 3:
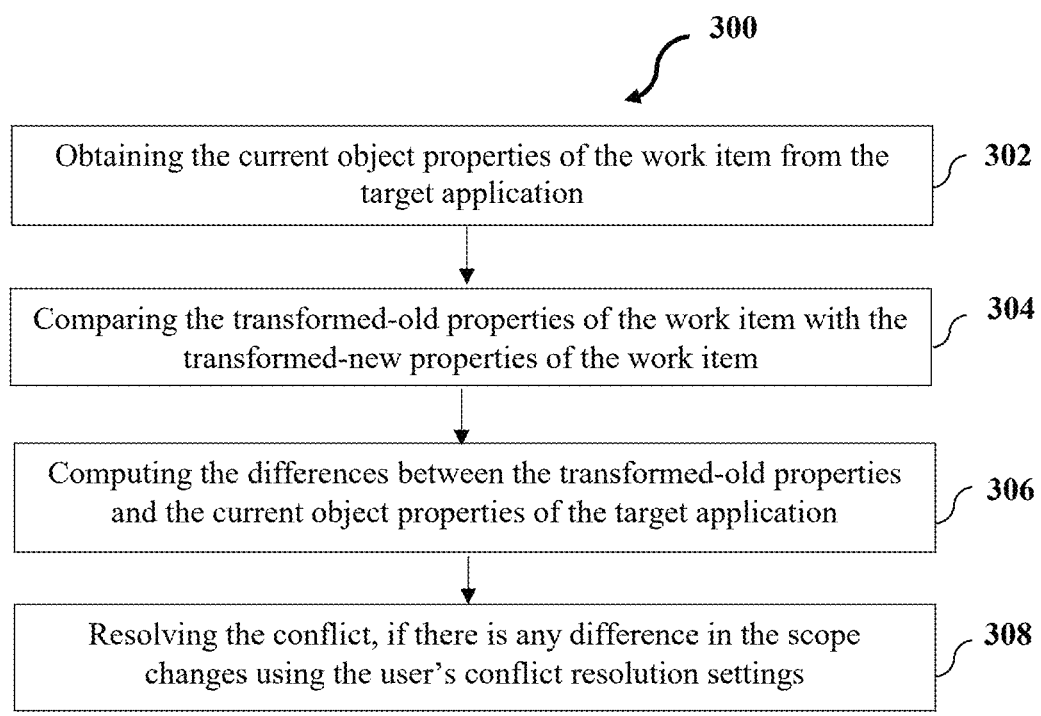
FIG. 3 illustrates a flowchart on a method for managing the conflicts between the old-source-object of the source application and the current-target-object of the target application, according to an embodiment herein.

FIG. 3 illustrates a flowchart on a method for managing the conflicts between the old-source-object of the source application and the current-target-object of the target application, according to an embodiment herein. The method 300 involves obtaining the current object properties of the work item from the target application at step 302. Further, the method 300 involves comparing the transformed-old properties of the work item with the current-target-object at step 304. In addition, the method 300 also compares the scope changes between the transformed-old properties and the current object properties of the target application at step 306. Furthermore, the method 300 involves resolving the conflict, if there is any difference in the scope changes using the user's conflict resolution settings at step 308.

Figure 4A:
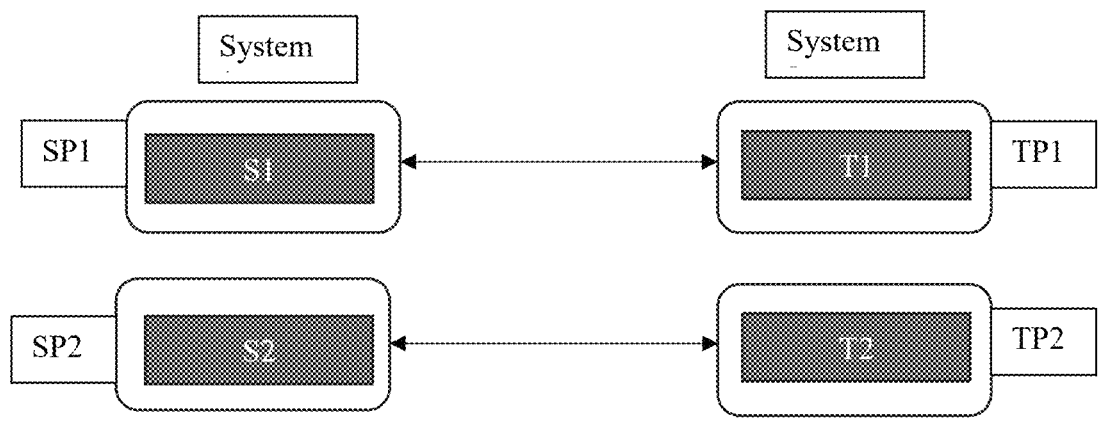
FIG. 4A illustrates a block diagram of an exemplary system illustrating the source system and the target system, according to an embodiment herein.
Figure 4B:
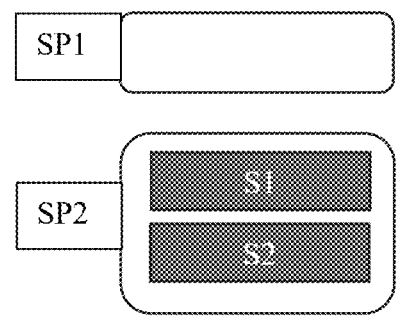
FIG. 4B illustrates the source system after moving work item S1 to scope SP2, according to an embodiment herein.
Figure 4C:
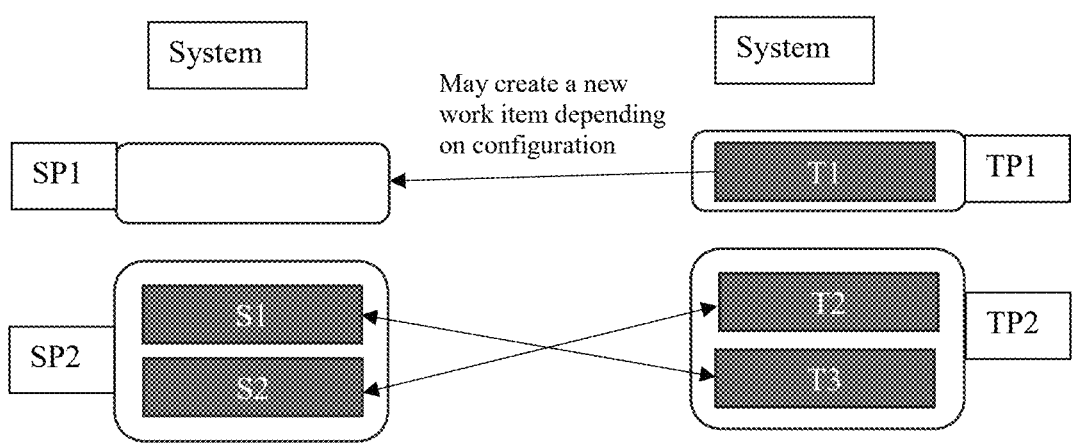
FIG. 4C illustrates a synchronization movement observed in a conventional system.

FIG. 4A illustrates a block diagram of an exemplary system illustrating the source system and the target system, according to an embodiment herein. FIG. 4A illustrates the current state of source system 1 and target system 2, where S1 from scope SP1 is synced to T1 in scope TP1 and S2 in scope SP2 is synced to T2 in scope TP2. When the user moves S1 from SP1 to SP2. FIG. 4B illustrates the source system after moving S1 to SP2, where there is no work item in SP1 and two work items in SP2. FIG. 4C illustrates a synchronization movement observed in the conventional system. In the existing system as illustrated in FIG. 4C there are two work items in source system 1 but three work items in the target system 2. The conventional or the existing system created T3 in the new scope TP2 against the movement of S1 from SP1 to SP2. Moreover, if T1 is updated and if sync is configured to recreate the entity in SP1 then sync will create a new entity in SP1. Moreover, T3 will not contain all the properties, such as comments, and attachments that were already synchronized to T1. In contrast, the embodiments herein will move T1 from TP1 to TP2, if target system 2 supports work item movement. If the target system 2 fails to support, then T3 will be created in TP2, such that T3 contains all the properties, such as comments and attachments, moreover T1 will be marked deprecated such that any more updates on T1 is not synchronized from the target system 2 to the source system 1. Hence, the embodiments herein will keep both the systems in consistent state, giving source system 1 and the target system 2 users correct and up to date state.

It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

While the disclosure is susceptible to various modifications and alternative forms, specific embodiment thereof has been shown by way of example in the drawings and will be described in detail above. It should be understood, however, that it is not intended to limit the disclosure to the forms disclosed, but on the contrary, the disclosure is to cover all modifications, equivalents, and alternatives falling within the scope of the disclosure.

Advantages of the Embodiments Herein

The embodiments herein disclose a system and a method for bidirectional replication of scope changes for work items between applications. The embodiments herein enable scope change for a work item in the destination system or target system. The embodiments herein identify scope change for a given work item and transform the scope change of the work item from a source application to a target application. The embodiments herein further check if the work item in the target application is in an expected state and then move the work item from one scope to another in the target application. Moreover, if the target application fails to support the movement of the work item from one scope to another, then the embodiments herein deprecate the work item in an old scope of the target application and create a new work item in the target application with a new scope.

Furthermore, the embodiments herein also addresses complex scenarios such as if the source application supports scope change, but the target application fails then the embodiments herein fully deprecates the old work item object and creates a new work item object. Further, multi-threading environment having multiple sync events in queue for same object is also handled. In addition, the embodiments herein also handles conflict scenarios for scope change where user moved object from one scope to another in both source and target applications. Furthermore, the embodiments herein provide an option to user to not move objects between scope, as per business requirement.

Hence, the primary objective of the embodiment herein is to provide an extensible solution to any kind of scope change within a given application and not limited to object type and project only. Further, the embodiments herein is extensible beyond work item, to any kind of data that can be uniquely identified. It can also be used to integrate scope change between any number and any type of application. Moreover, the embodiments herein can use any kind of persistent database or data store like file system, RDBMS, NoSQL, etc.

Although the embodiments herein are described with various specific embodiments, it will be obvious for a person skilled in the art to practice the embodiments herein with modifications.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phrases or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A method for bidirectional replication of scope changes for work items between applications, the method comprising steps of:
   a. identifying and fetching a scope change from a scope change event for a work item in a source application;
   b. transforming the scope change of the work item from the source application to a target application, and wherein an old-source-object in the source application is transformed to obtain an old-target-object and a new-source-object is transformed to obtain a current-target-object of the work item while transforming the scope change of the work item from the source application to the target application;
   c. checking for conflicts between the old-source-object of the source application and the current-target-object of the target application, and resolving the conflicts if any as per user configuration;
   d. validating whether the work item is in an expected state on the target application;
   e. moving the work item from one scope to another scope in the target application; and wherein, then the method the work item in an old scope of the target application deprecated and a new work item in the target application in a new scope created, when the target application fails to support the moving of the work item from one scope to another scope; and
   f. performing update operations depending upon the properties updated in the source application, and the work item is transitioned from the old scope to the new scope of the target application.

2. The method according to claim 1, wherein the scope change includes a change of the work item or movement of work item, and wherein the scope change event comprises the old-source-Object and the new-source-object, and wherein the old-source-object comprises values set in the work item before the scope change, and wherein the new-source-object comprises values set in the work item after the scope change.

3. The method according to claim 1, wherein the step of fetching the scope change event for the work item of the source application comprises the steps of:
   a. detecting and fetching the scope change events for the work item within a given scope from the source application; and wherein the scope change events comprise an object unique identifier on which an event occurred, time of an event, changes made to the work item, old values comprising properties of the work item before the scope change and new values comprising the properties of the work item after the scope change;
   b. iterating through the scope change events to identify the objects that are moved to the scope from other scopes; and
   c. synchronizing all the scope changes of the objects with the target application.

4. The method according to claim 1, wherein the step of transforming the old-source-object in the source application comprises the steps of:
   a. obtaining the old scope from the scope change events;
   b. obtaining the work items object properties comprising old values from the scope change events;
   c. fetching user configuration for transformation of the old scope of the work item;
   d. transforming the old values to obtain transformed-old properties; and
   e. returning transformed-old properties.

5. The method according to claim 1, wherein the step of transforming the new-source-object comprises the steps of:
   a. obtaining the new scope from the scope change events;
   b. obtaining the work items object properties comprising new values from the scope change events;
   c. fetching user configuration for transformation of the new scope of the work item;
   d. transforming the new values to obtain transformed-new properties; and wherein the transformed-new properties comprises those settings the user needs to perform in case the target application fails to support moving objects between the scope; and
   e. returning the transformed-new properties.

6. The method according to claim 1, wherein the transformation of the scope change of the work item from the source application to the target application depends on the user configuration and the transformation information configured by the user for the old scope of the work item and the new scope of the work item.

7. The method according to claim 6, wherein the user configuration comprises properties of the source application intended to be synchronized to the target application by the user while creating the object and updating the object.

8. The method according to claim 1, wherein the step of managing the conflicts between the old-source-object of the source application and the current-target-object of the target application, comprises the steps of:
   a. obtaining the current object properties of the work item from the target application;
   b. comparing the transformed-old properties of the work item with the current-target-object;
   c. comparing the scope changes between the transformed-old properties and the current object properties of the target application;
   d. resolving the conflict, if there is any difference in the scope changes using user's conflict resolution settings.

9. The method according to claim 1, further comprises fetching the user configuration by deprecating the work item in the target application including soft deleting or updating the work item object by adding notes or comments, for deprecating the work item in the old scope of the target application.

10. The method according to claim 1, wherein the step of moving the work item from one scope to another scope in the target application if the target application fails to support the movement of the work item, comprises the steps of:
    a. fetching the existing work item object in the target application;

b. constructing new work item object in the new scope of the target application by:
   i. setting object properties in the new work item object;
   ii. creating the new work item object in the target application;
   iii. copying comments, attached files, links and any other field from the existing work item object to the new work item object;
c. fetching the user configuration for marking the work item objects to be deprecated in the target application;
d. applying the user configuration for the deprecated work item objects to the existing work item object; and
e. updating a persistent data store to not integrate any updates with deprecated work item objects.

11. A system for bidirectional replication of scope changes for work items between applications, the system comprising:
   a. a scope change identification module configured to identify and fetch a scope change from a scope change event for a work item in a source application;
   b. a transformation module configured to transform the scope change of the work item from the source application to a target application; wherein the transformation module is configured to transform an old-source-object in the source application to obtain an old-target-object and to transform a new-source-object to obtain a current-target-object of the work item while transforming the scope change of the work item from the source application to the target application;
   c. a conflict management module configured to check for conflicts between the old-source-object of the source application and the current-target-object of the target application, and resolving the conflicts if any as per user configuration;
   d. a validation module configured to validate if the work item is in an expected state on the target application;
   e. a synchronization module configured to move the work item from one scope to another scope in the target application, and wherein the synchronization module is configured to deprecate the work item in an old scope of the target application and create a new work item in the target application in a new scope when the target application fails to support the movement of the work item from one scope to another scope, then; and
   f. a scope updation module configured to perform update operations depending upon the properties updated in the source application, and the work item is then transitioned from the old scope to the new scope of the target application.

12. The system according to claim 11, wherein the scope change identification module is configured to scope change by performing a change of the work item or movement of work item, and wherein the scope change event comprises the old-source-Object and the new-source-object, and wherein the old-source-object comprises values set in the work item before the scope change, and wherein the new-source-object comprises values set in the work item after the scope change.

13. The system according to claim 11, wherein the scope change identification module is configured for fetching the scope change event for the work item of the source application by:
   a. detecting and fetching the scope change events for the work item within a given scope from the source application, and wherein the scope change events comprise an object unique identifier on which an event occurred, time of an event, changes made to the work item, old values comprising properties of the work item before the scope change and new values comprising the properties of the work item after the scope change;
   b. iterating through the scope change events to identify the objects that are moved to the scope from other scopes; and
   c. synchronizing all the scope changes of the objects with the target application.

14. The system according to claim 11, wherein the transformation module is configured for transforming the old-source-by:
   a. obtaining the old scope from the scope change events;
   b. obtaining the work items object properties comprising old values from the scope change events;
   c. fetching user configuration for transformation of the old scope of the work item;
   d. transforming the old values to obtain transformed-old properties; and e. returning transformed-old properties.

15. The system according to claim 11, wherein the transformation module is configured for transforming the new-source-object by
   a. obtaining the new scope from the scope change events;
   b. obtaining the work items object properties comprising new values from the scope change events;
   c. fetching user configuration for transformation of the new scope of the work item;
   d. transforming the new values to obtain transformed-new properties, and wherein the transformed-new properties comprises those settings the user needs to perform in case the target application fails to support moving objects between the scope; and
   e. returning the transformed-new properties.

16. The system according to claim 11, wherein the transformation module is configured to transform the scope change of the work item based on the user configuration and the transformation information configured by the user for the old scope of the work item and the new scope of the work item.

17. The system according to claim 16, wherein the user configuration comprises the properties of the source application intended to be synchronized to the target application the user while creating the object and updating the object.

18. The system according to claim 11, wherein the conflict management module is configured for managing the conflicts by:
   a. obtaining the current object properties of the work item from the target application;
   b. comparing the transformed-old properties of the work item with the current-target-object in the target application;
   c. comparing the scope changes between the transformed-old properties and the current object properties of the target application; and
   d. resolving the conflict, if there is any difference in the scope changes using user's conflict resolution settings.

19. The system according to claim 11, wherein the synchronization module is configured to fetch the user configuration for deprecating the work item in the old scope of the target application by deprecating the work item in the target application including soft deleting or updating the work item object by adding notes or comments.

20. The system according to claim 11, wherein the synchronization module is configured for moving the work item from one scope to another scope in the target application when the target application fails to support the movement of the work item, by:

a. fetching the existing work item object in the target application;
b. constructing new work item object in the new scope of the target application by:
i. setting object properties in the new work item object;
ii. creating the new work item object in the target application;
iii. copying comments attached files, links and any other field from the existing work item object to the new work item object;
c. fetching the user configuration for marking the work item objects to be deprecated in the target application;
d. applying the user configuration for the deprecated work item objects to the existing work item object; and
e. updating a persistent data store to not integrate any updates with deprecated work item objects.

\* \* \* \* \*